(12) United States Patent
Sasaki et al.

(10) Patent No.: US 11,746,970 B2
(45) Date of Patent: Sep. 5, 2023

(54) CEILING-MOUNTED TYPE LIGHTING DEVICE

(71) Applicants: ELCO CO., LTD, Sagamihara (JP); EVERS CO., LTD, Sagamihara (JP); DAI-ICHI SHOMEI CO., LTD, Tokyo (JP)

(72) Inventors: Michiru Sasaki, Tokyo (JP); Takahito Yoshizawa, Tokyo (JP)

(73) Assignees: ELCO CO., LTD, Kanagawa (JP); EVERS CO., LTD, Kanagawa (JP); DAI-ICHI SHOMEI CO., LTD, Tokyo (JP)

(*) Notice: Subject to any disclaimer, the term of this patent is extended or adjusted under 35 U.S.C. 154(b) by 0 days.

(21) Appl. No.: 17/630,996

(22) PCT Filed: Jun. 22, 2020

(86) PCT No.: PCT/JP2020/024400
§ 371 (c)(1),
(2) Date: Jan. 28, 2022

(87) PCT Pub. No.: WO2021/019957
PCT Pub. Date: Feb. 4, 2021

(65) Prior Publication Data
US 2022/0178507 A1    Jun. 9, 2022

(30) Foreign Application Priority Data

Jul. 29, 2019 (JP) .................. 2019-138849

(51) Int. Cl.
*F21S 8/02* (2006.01)
*F21V 21/26* (2006.01)
(Continued)

(52) U.S. Cl.
CPC .............. *F21S 8/026* (2013.01); *F21V 21/26* (2013.01); *F21V 23/0457* (2013.01); *F21Y 2115/10* (2016.08)

(58) Field of Classification Search
CPC ....... F21S 8/026; F21V 21/26; F21V 23/0457
See application file for complete search history.

(56) References Cited

U.S. PATENT DOCUMENTS 4,639,838 A   1/1987   Kato et al.
10,473,311 B2  11/2019  Fujisawa
(Continued)

FOREIGN PATENT DOCUMENTS

JP    S5525681 B2   7/1980
JP    S61226031 A  10/1986
(Continued)

*Primary Examiner* — Christopher E Dunay
(74) *Attorney, Agent, or Firm* — The Webb Law Firm

(57) ABSTRACT

A light-receiving unit containing four optical sensors arranged crosswise and a light-shielding body containing four through-holes confronting light-receiving surfaces of the optical sensors, and a tilt adjustment mechanism containing first and second movable bodies which are mounted on first and second rotation shafts arranged on a same plane to cross at right angles are provided. The tilt adjustment mechanism is mounted in a housing constituting a ceiling-mounted type lighting device and the light-receiving unit and a lighting lamp are mounted on a rotational center axis of the second moving body. Tilt adjustment light emitted from a treatment table hits the optical sensors via the light-shielding body.

8 Claims, 13 Drawing Sheets

(51) Int. Cl.
*F21V 23/04* (2006.01)
*F21Y 115/10* (2016.01)

(56) References Cited

U.S. PATENT DOCUMENTS

| | | | | |
|---|---|---|---|---|
| 2011/0015492 | A1* | 1/2011 | Mangiardi | B65F 1/0093 600/249 |
| 2012/0161647 | A1* | 6/2012 | Fornasiero | H05B 45/20 315/158 |
| 2019/0203920 | A1* | 7/2019 | Strölin | F21V 23/0442 |
| 2021/0108783 | A1* | 4/2021 | Hallack | F21S 2/005 |
| 2021/0140608 | A1* | 5/2021 | Walvekar | H04N 23/695 |
| 2021/0236231 | A1* | 8/2021 | Westenfelder, II | F21V 23/0442 |
| 2021/0353813 | A1* | 11/2021 | Wald | F04D 25/088 |

FOREIGN PATENT DOCUMENTS

| | | |
|---|---|---|
| JP | H1134801 A | 5/1989 |
| JP | 20025738 A | 1/2002 |
| JP | 2005233726 A | 9/2005 |
| JP | 201691813 A | 5/2016 |

\* cited by examiner

[FIG.1]
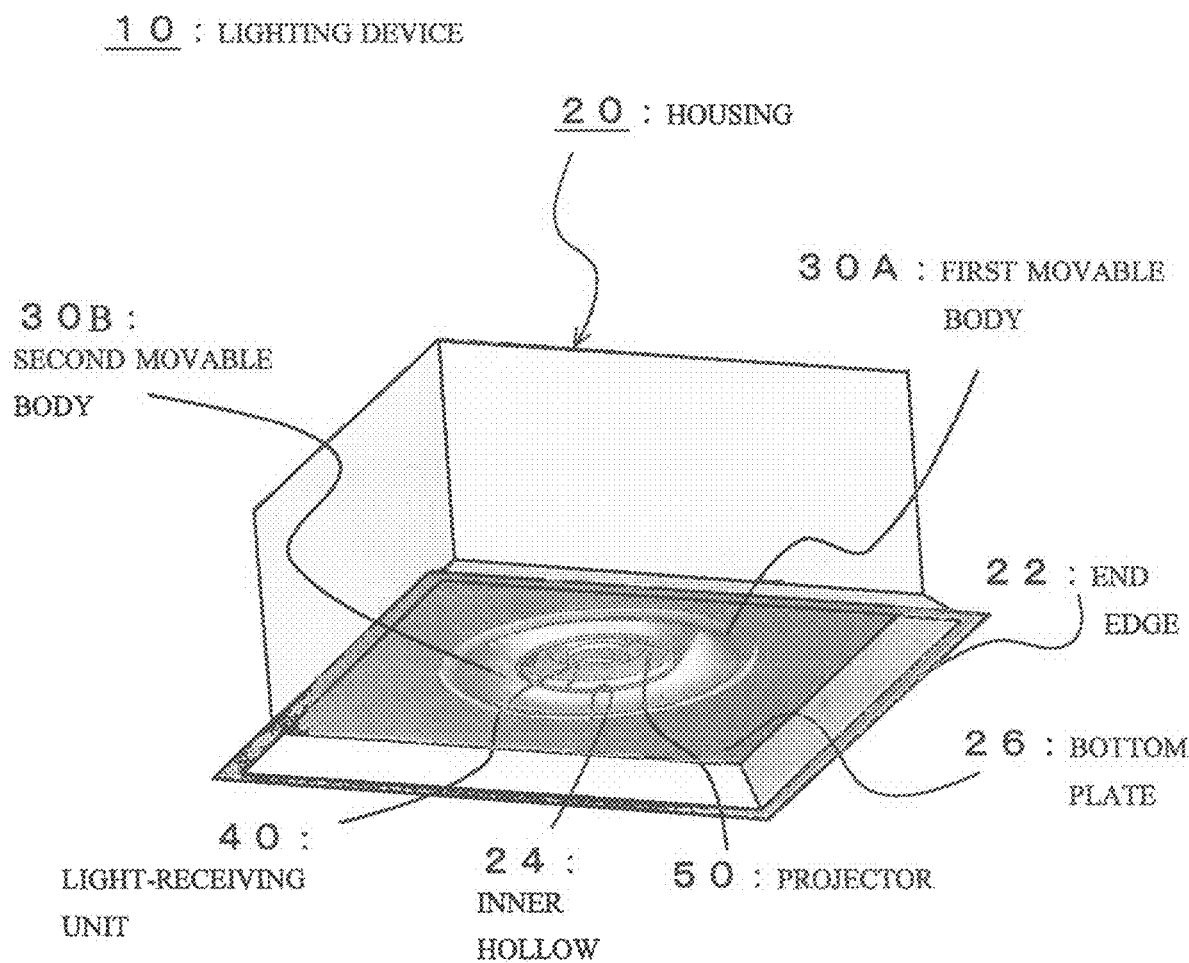

[FIG.2]
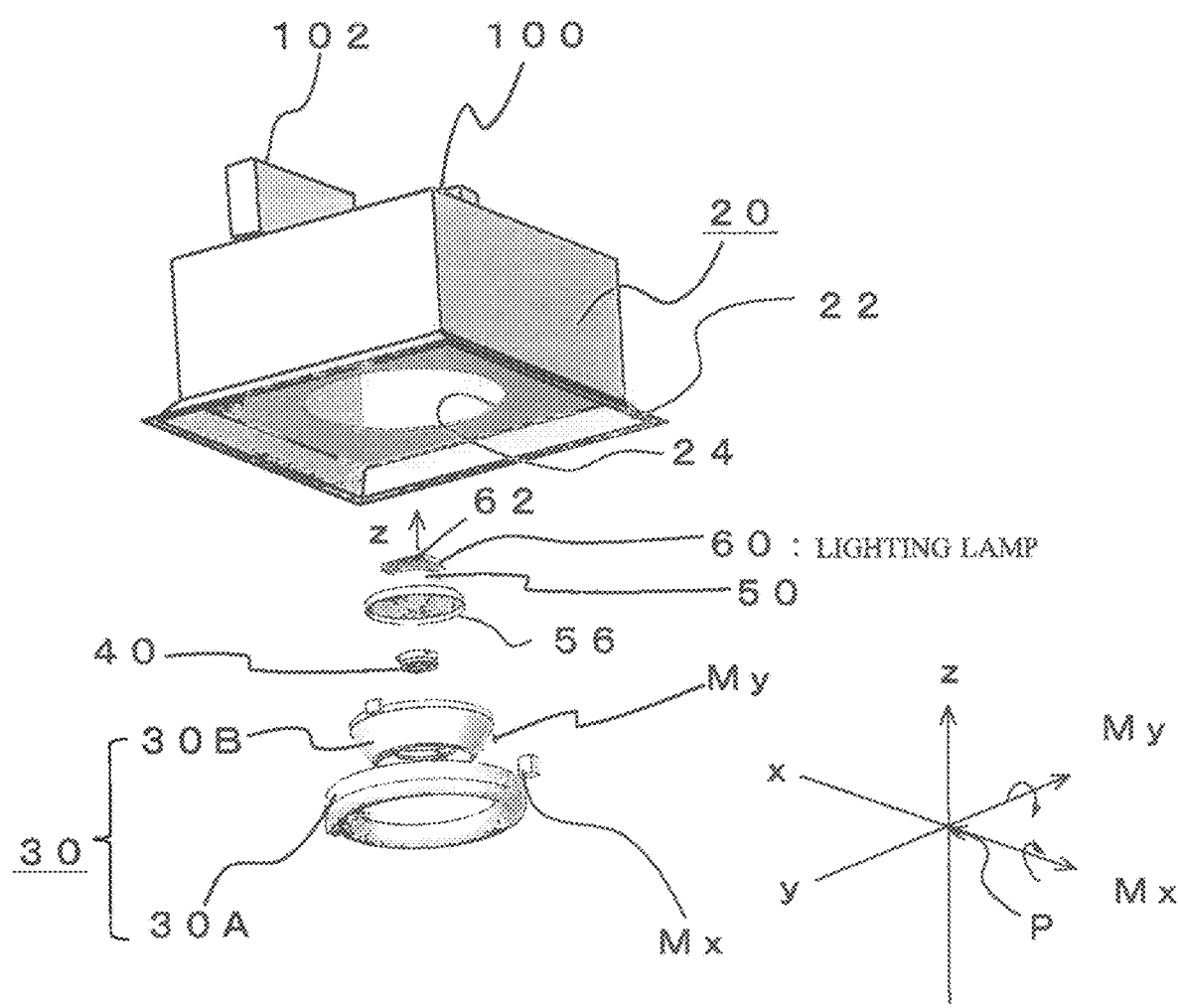

[FIG.3]
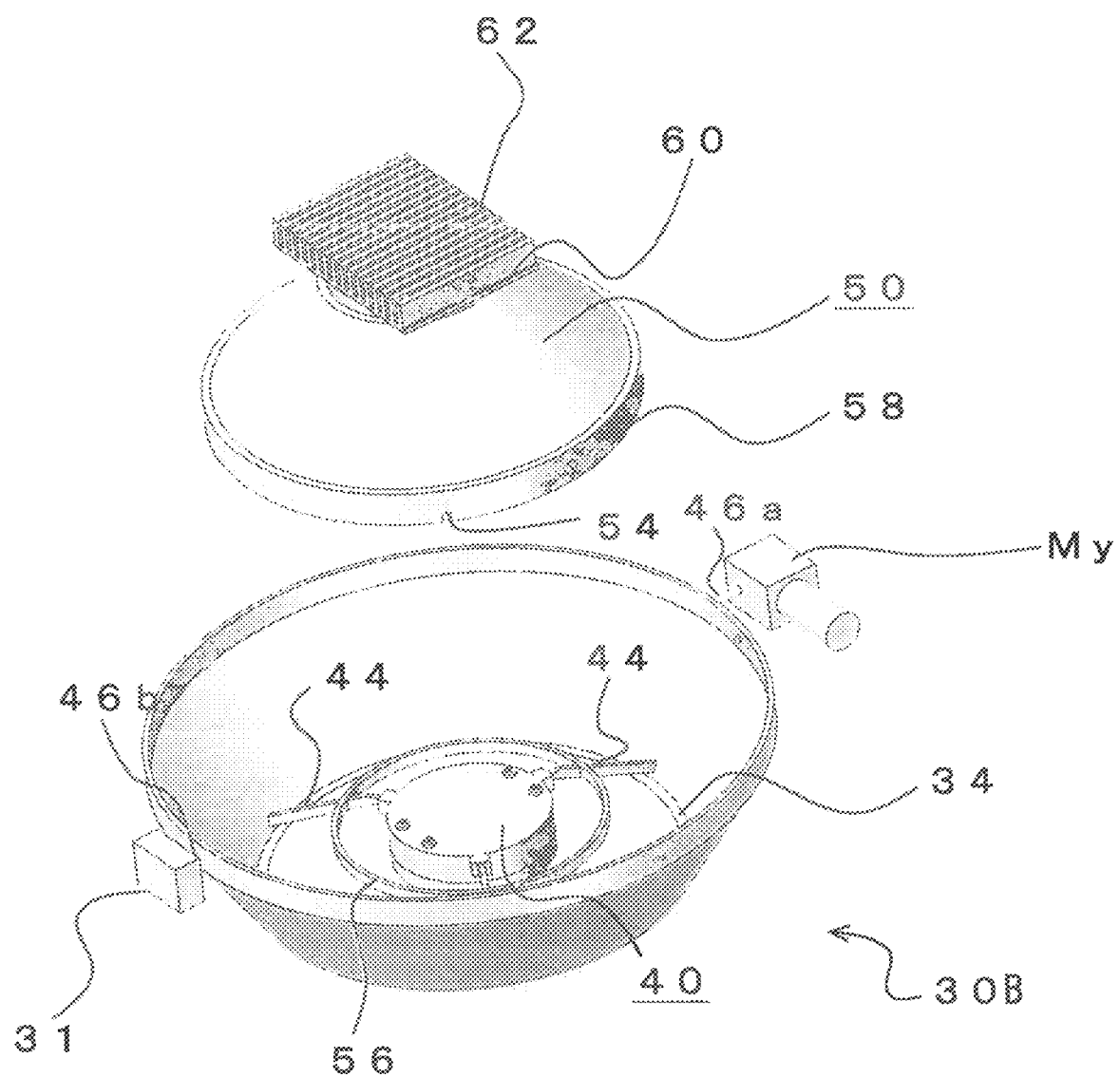

[FIG.4]
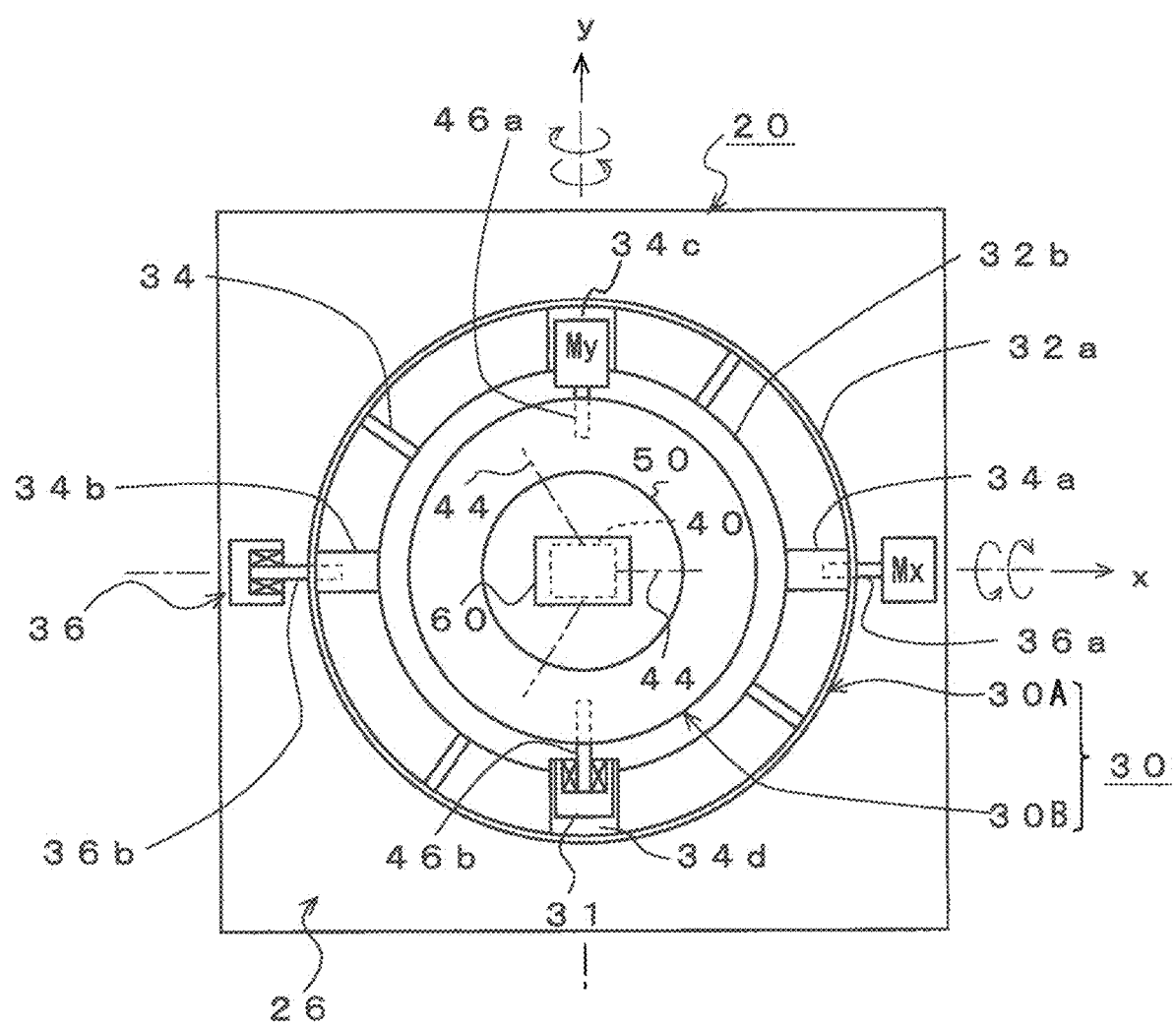

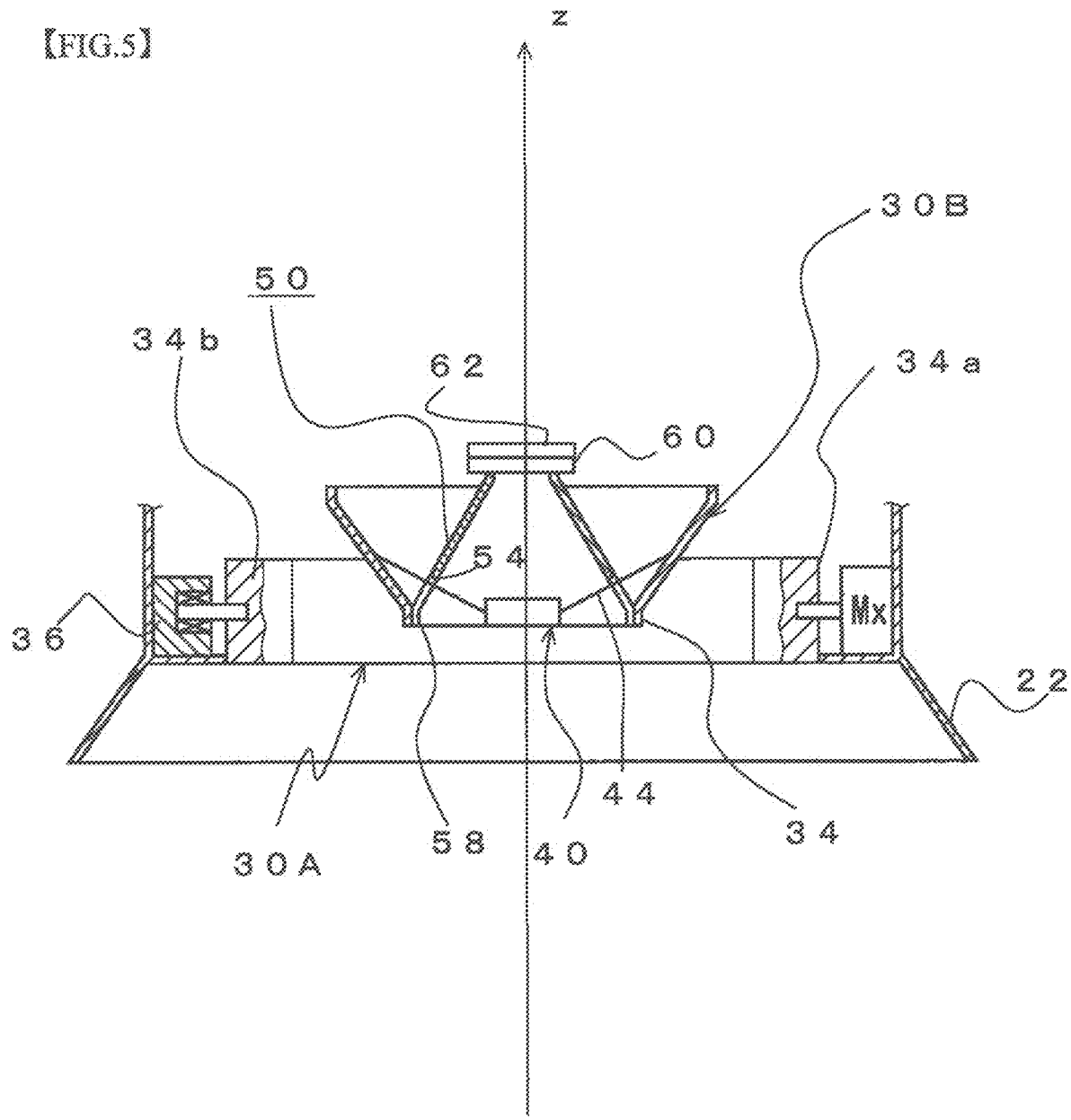
[FIG.5]

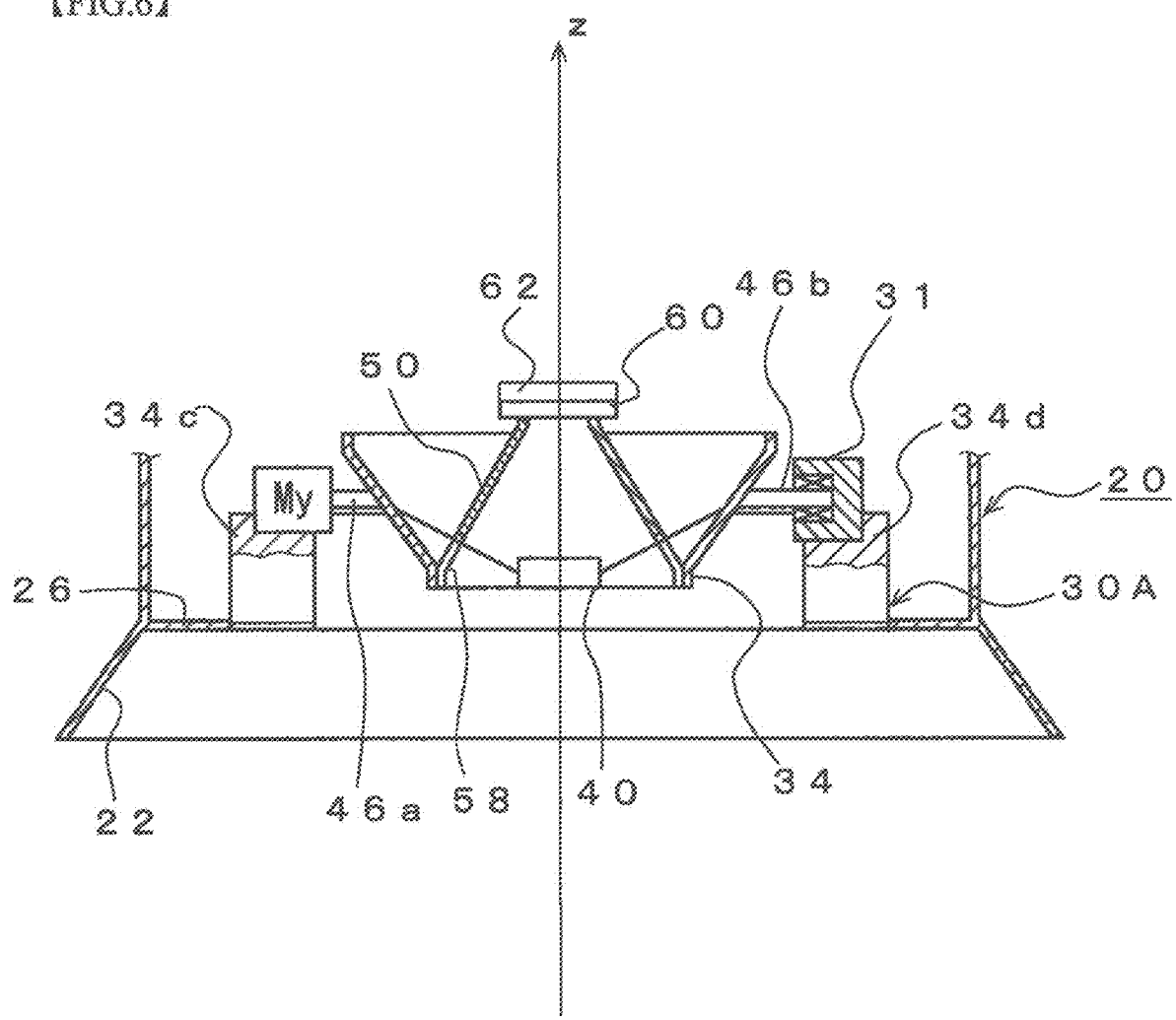
[FIG.6]

[FIG.7]
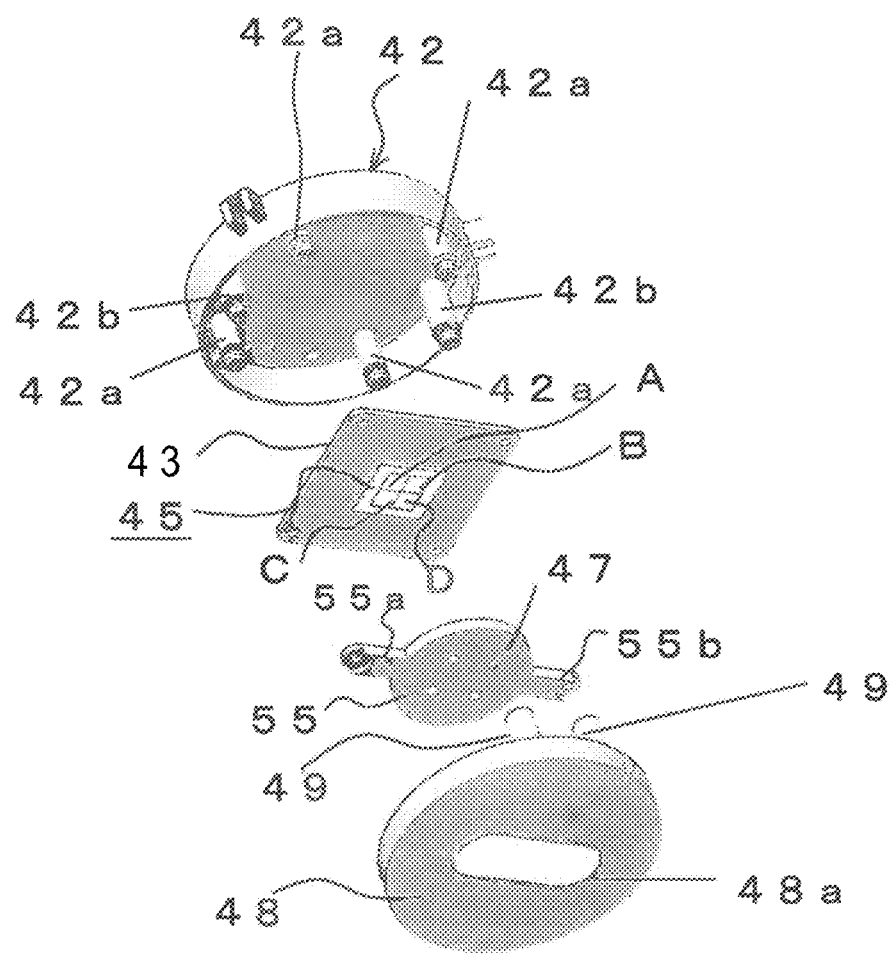

[FIG.8]
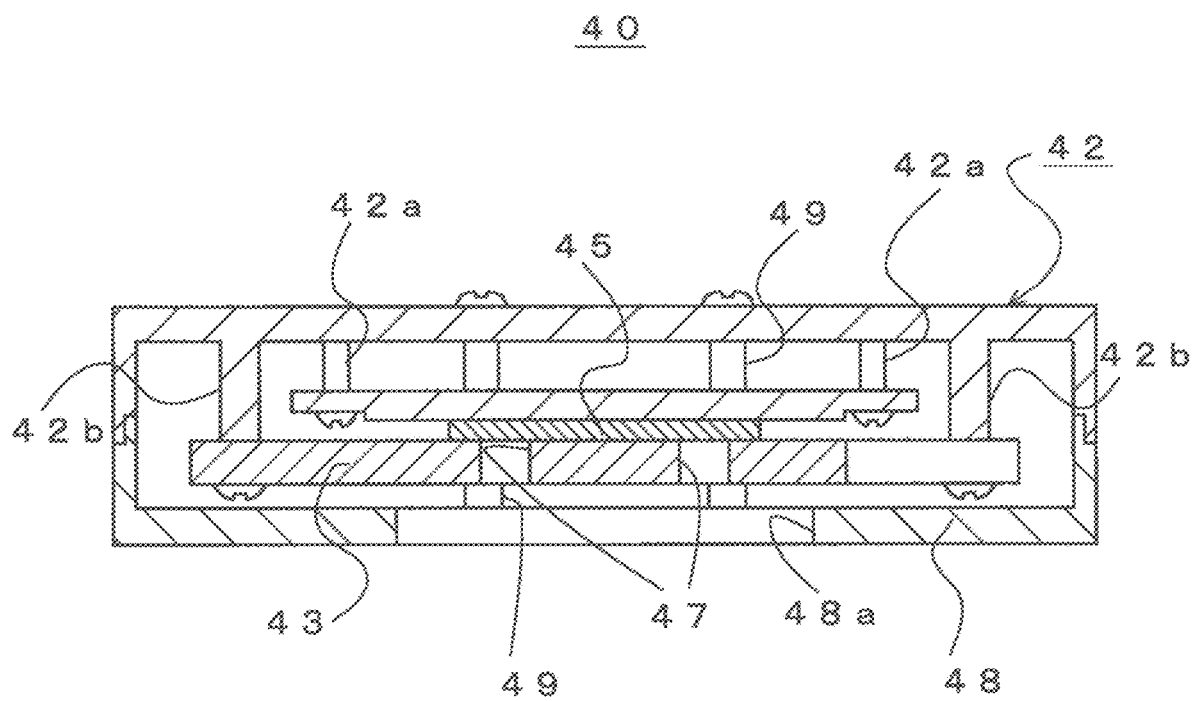
[FIG.9]
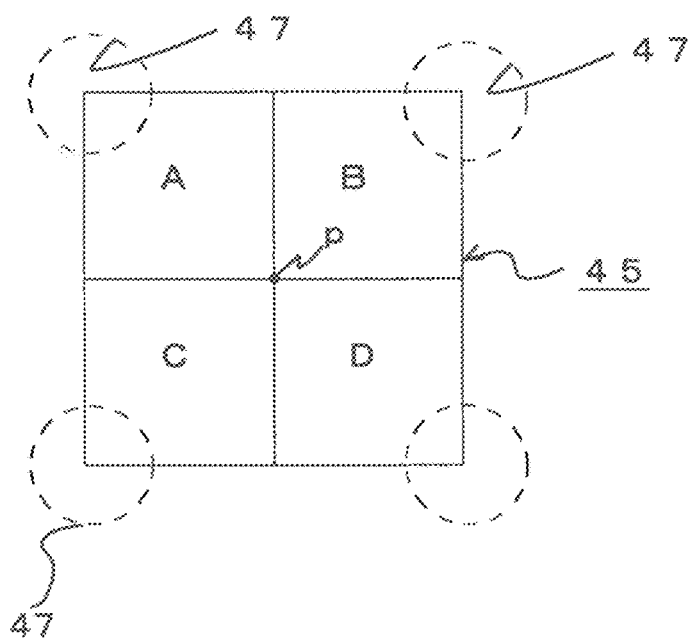

[FIG.10]
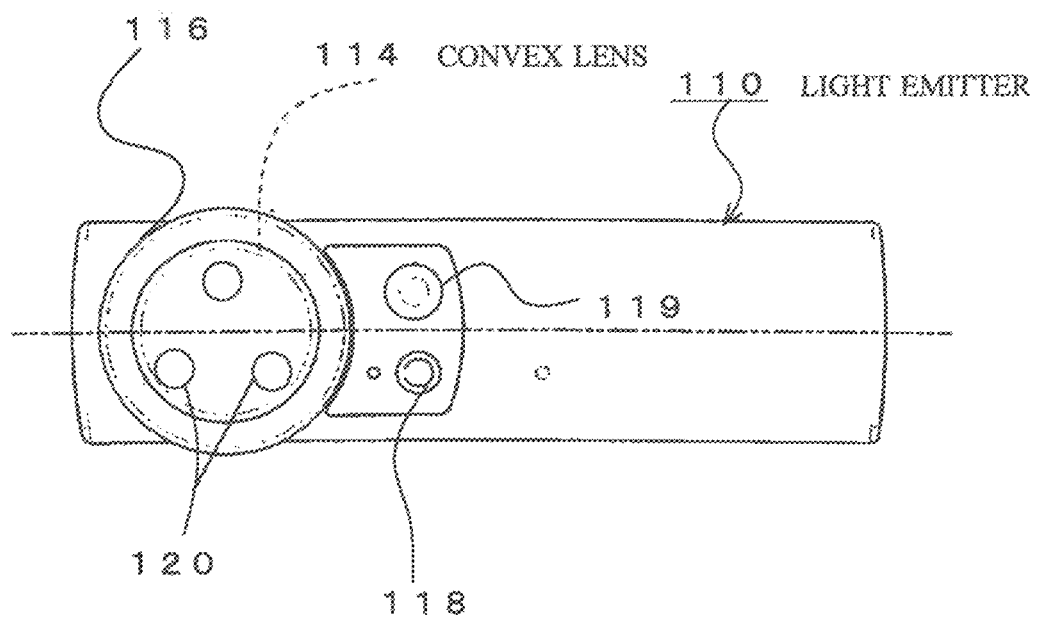
[FIG.11]
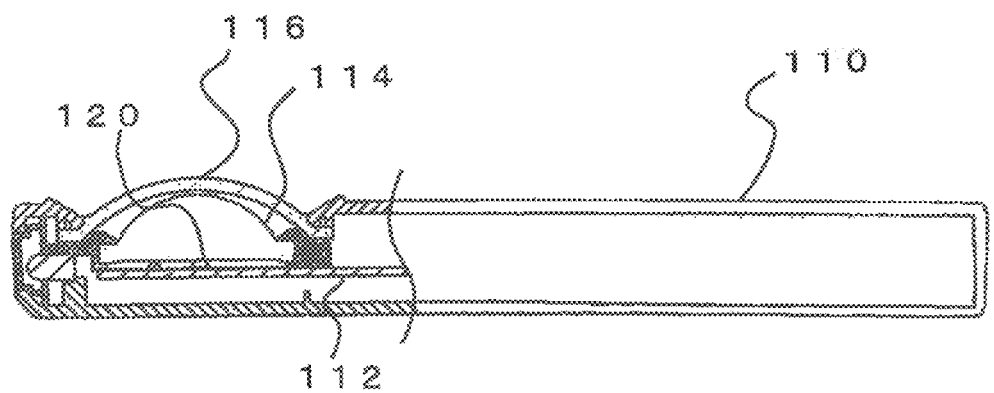

[FIG.12]
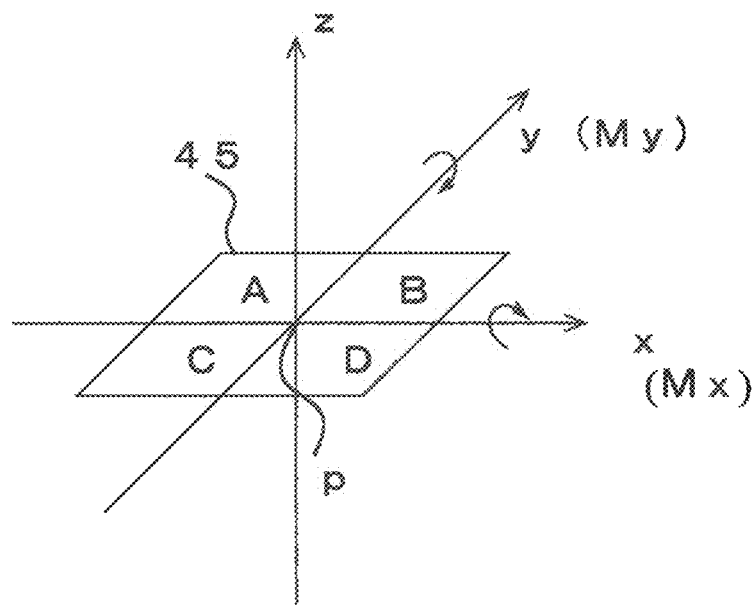
[FIG.13]
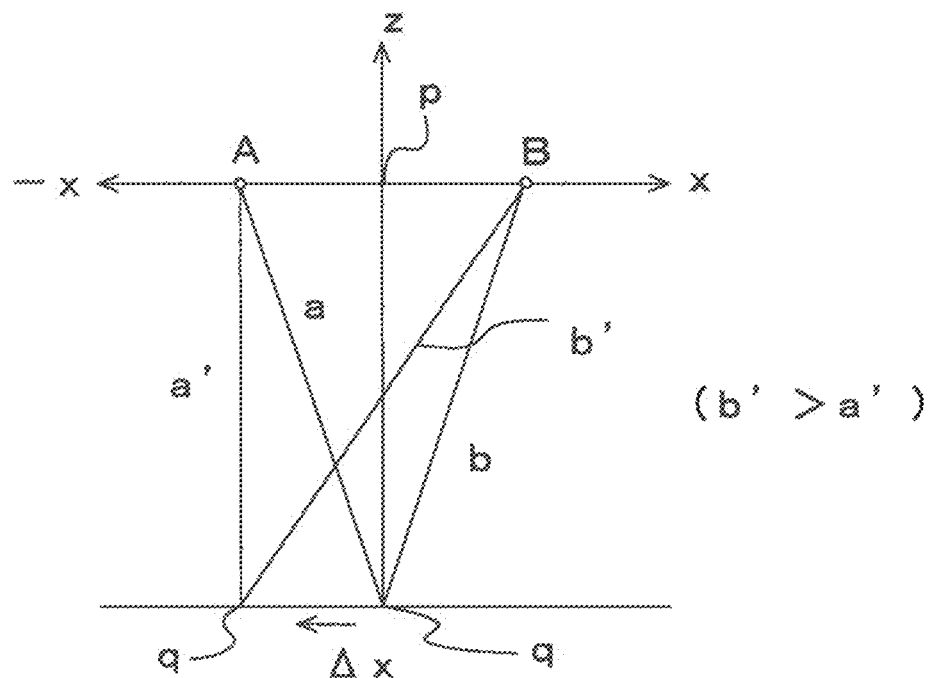

[FIG.14]
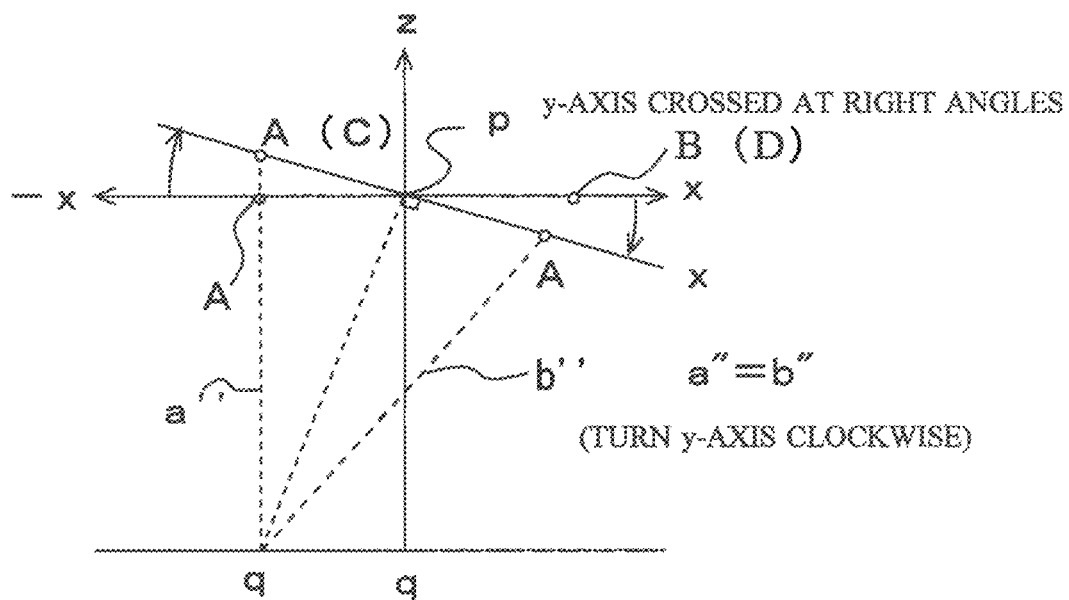
[FIG.15]
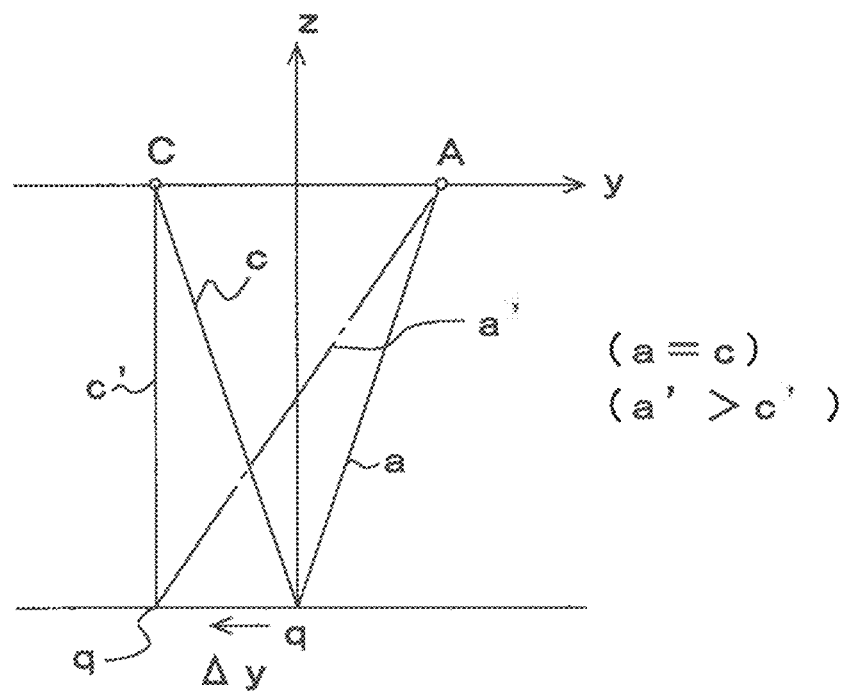

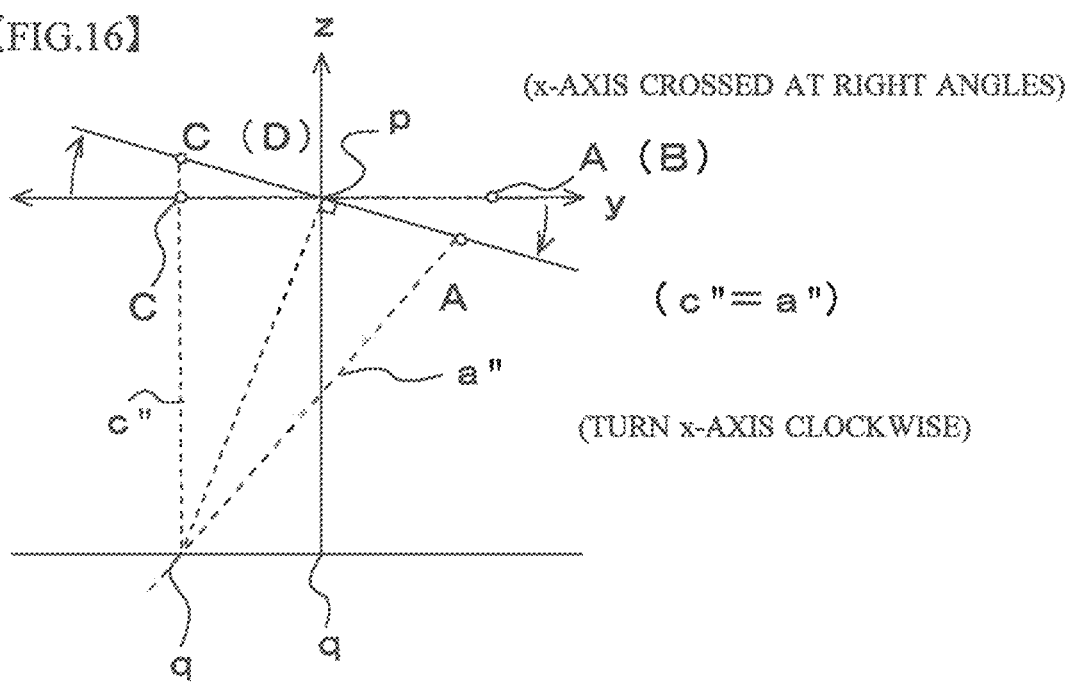

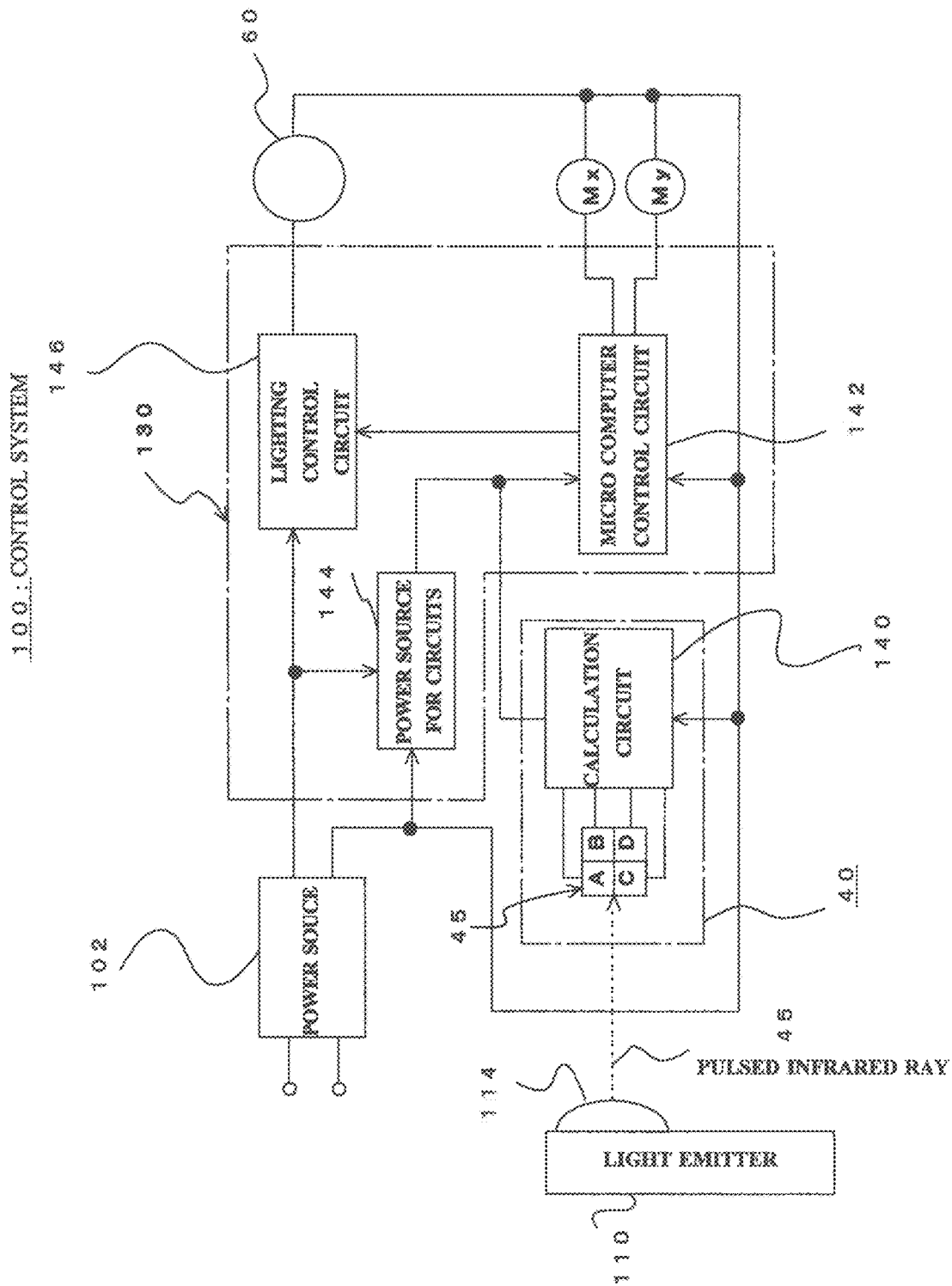
[FIG. 17]

CEILING-MOUNTED TYPE LIGHTING DEVICE

CROSS-REFERENCE TO RELATED APPLICATIONS

This application is the United States national phase of International Application No. PCT/JP2020/024400 filed Jun. 22, 2020, and claims priority to Japanese Patent Application No. 2019-138849 filed Jul. 29, 2019, the disclosures of which are hereby incorporated by reference in their entirety.

BACKGROUND

Field

The present invention relates to a ceiling-mounted type lighting device that enables to be adjusted a concentrated position of light from a lighting lamp mounted in a ceiling or the like.

Description of Related Art

As a lighting device used in an operating room or the like among medical lighting devices in which a lighting position can be controlled, the one shown in a patent document 1 has been known. The lighting device disclosed in the patent document 1 controls a position of a lighting lamp along two axes such as x-axis and y-axis by emitting light from a light emitter to a surgical site, receiving its reflected light by a light receiver and concentrating the lighting position of the lighting lamp to the surgical site based on an intensity signal of the received light.

In a patent document 2, like the patent document 1, three axes such as x-, y- and z-axes of a housing 1 can be also adjusted on the basis of an intensity signal of the light received by a light receiver.

In a patent document 3, like the patent document 2, three axes such as x-, y- and z-axes can be also adjusted to adjust a concentrated position of light from a lighting lamp mounted on a ceiling.

Patent document 1: Japanese Patent Application Publication No. S61-226031;
Patent document 2: Japanese Patent Application Publication No. H01-134801; and
Patent document 3: Japanese Patent Publication No. S55-25681.

SUMMARY

Both of the above-mentioned Patent Documents 1 and 2 relate to lighting devices each of which is devised to perform shadowless lighting to a surgical site by accommodating a plurality of lighting lamps as the lighting lamp in a housing and adjusting directions of beams from the plurality of the lighting lamps, in which the lighting device itself is supported by a freely movable mounting arm or the like and positions of the beams to be emitted to the surgical site can be adjusted by changing the tilt or the like of the mounting arm and the lighting lamps themselves. Therefore, these lighting devices have not such a configuration to embed and fix a housing itself in a ceiling.

The two-axes adjustment has been performed in the patent document 1 and the three-axes adjustment has been performed in the patent document 2, so that the adjusting methods thereof are different from each other but in both cases, an axis of the housing has been adjusted by once hitting the light emitted from the light emitter on the surgical site and receiving its reflected light by the light-receiver.

Since the surgical site do not always stay in a position that is opposite to the housing, the light-receiver cannot necessarily receive the reflected light from the surgery site. In effect, there has been a problem such that it takes too much time to adjust the housing (lighting lamp) until the housing confronts the surgical site accurately.

The patent document 3 relates to a ceiling-mounted type lighting device used in a treatment room such as a maternity room, unlike the patent documents 1 and 2, in which sensor units, in each of which a prism, an optical sensor and a sensor-unit-driving motor are integrated, are respectively mounted on both ends of the housing (lighting member) and these two sensor units are driven to concentrate light from the housing to a treated site. Accordingly, a configuration of each of the sensor units and a positional control of the sensor units become complex considerably. In other words, this is because an angle to move the lighting lamp is calculated to control the driving motor while a rotation angle the sensor units have moved is calculated.

Therefore, this invention solves these problems to present a ceiling-mounted type lighting device that is used in a treatment room or the like and enables to be adjusted a concentrated position of light from a lighting lamp to the treatment table, by which a tilt adjustment mechanism for the lighting lamp mounted in a housing is simplified and an adjustment of the concentrated position of light can be made easy.

To solve these problems, the ceiling-mounted type lighting device according to the invention described in one non-limiting embodiment is characterized in that the device includes a light-receiving unit containing four optical sensors arranged crosswise and a light-shielding body through which four through-holes are cut as positions that are respectively opposite to light-receiving surfaces of the optical sensors; and a tilt adjustment mechanism containing first and second movable bodies which are mounted on first and second rotation shafts arranged on a same plane to cross at right angles wherein the light-shielding body is arranged so as to be opposite to the optical sensors with any possible small clearance being kept; single tilt adjustment light emitted from a light emitter of a side of the treatment table passes through the through-holes to form four spotted tilt adjustment lights which are respectively concentrated to the sensors; the tilt adjustment mechanism is mounted in a housing constituting the ceiling-mounted type lighting device; and the light-receiving unit and a lighting lamp illuminating a side of the light emitter are mounted on a rotational center axis of the second moving body, whereby a tilt of the light-receiving unit is adjusted on the basis of outputs from the optical sensors.

The light-receiving unit in the ceiling-mounted type lighting device according to the invention described another non-limiting embodiment is characterized in that the unit includes a control circuit for calculating outputs from the four optical sensors obtained at the same time when receiving tilt adjustment light from the light emitter, and controlling rotations of the first and second rotation shafts based on a tilt control outputs to the light-receiving unit produced on the basis of calculation output.

To solve these problems, the second movable body in the ceiling-mounted type lighting device according to the invention described in another non-limiting embodiment is characterized in that the second movable body is rotatably mounted inside the first movable body and in a rotational plane which crosses at right angles of the rotation shaft of the first movable body.

To solve these problems, the ceiling-mounted type lighting device according to the invention described in another non-limiting embodiment is characterized in that the second movable body has a truncated cone form, the second movable body is arranged like an inverse conical shape, the lighting lamp is mounted on an upper side thereof, and the light receiving unit is mounted on a lower side thereof.

The light-receiving unit in the ceiling-mounted type lighting device according to the invention described in another non-limiting embodiment is characterized in that said unit is arranged in a plane passing through central axes of the first and second movable bodies.

As described above, in the ceiling-mounted type lighting device according to the invention, the tilt adjustment mechanism of the lighting lamp containing the first and second movable bodies is mounted in the housing, each of the movable bodies is rotatable, the light-receiving unit containing four optical sensors and a light shielding body having four through-holes in front thereof and a lighting lamp are arranged in connection with each movable body, a tilt of the light-receiving unit to the treatment table is detected on the basis of four receiving signals simultaneously obtained from the optical sensors utilizing the tilt adjustment light emitted from the treatment table side and the tilt of the lighting lamp can be adjusted with being synchronized with the light-receiving unit, so that this light-receiving unit always confronts the treatment table.

Accordingly, since it is possible to adjust the tilt of the lighting lamp using direct light from a light emitter side and the spotted light concentrated from the direct light, the tilt adjustment can be easily and accurately performed. Since the two movable bodies used for the tilt adjustment are rotatably arranged on the same rotation shaft in the housing and the light-receiving unit and the lighting lamp are arranged in connection with these movable bodies, the tilt of the light-receiving unit and the lighting lamp can be adjusted with them being synchronized, which enables a configuration of the tilt adjustment mechanism to be simplified.

BRIEF DESCRIPTION OF THE DRAWINGS

FIG. 1 is a perspective view showing an example of a ceiling-mounted type lighting device with a lighting lamp to be mounted on a ceiling.

FIG. 2 is an exploded perspective view of the device shown in FIG. 1.

FIG. 3 is an exploded perspective view showing a part of the device shown in FIG. 1.

FIG. 4 is a plan view of an essential part including an important portion of the device shown in FIG. 1.

FIG. 5 is a cross section of the part of FIG. 4, taken along a transverse direction, in FIG. 4.

FIG. 6 is a cross section of the part of FIG. 4, taken along a direction that crosses at right angles of that in FIG. 5.

FIG. 7 is a perspective view of an essential part showing an example of a light-receiving unit.

FIG. 8 is a cross section of the part of FIG. 7, taken along a transverse direction thereof.

FIG. 9 is a diagram illustrating a relationship between a sensor unit and each light-receiving spot.

FIG. 10 is a plan view showing an example of a light emitter.

FIG. 11 is a cross section of the light emitter of FIG. 10.

FIG. 12 is a diagram illustrating a relationship between four optical sensors and three axes.

FIG. 13 is a diagram for a tilt adjustment using a pair of optical sensors A and B arranged on an x-axis direction when a light emitter and a sensor unit are faced to each other.

FIG. 14 is a diagram illustrating a relationship between the light emitter and the sensor unit when the light emitter and the sensor unit are faced to each other from a situation where they are not faced to each other.

FIG. 15 is a diagram for a tilt adjustment using a pair of optical sensors C and D arranged on a y-axis direction when a light emitter and a sensor unit are faced to with each other.

FIG. 16 is a diagram illustrating a relationship between the light emitter and the sensor unit when the light emitter and the sensor unit are faced to each other from a situation where they are not faced to with each other.

FIG. 17 is a schematic view illustrating an example of a control system of the ceiling-mounted type lighting device.

DETAILED DESCRIPTION

Executed Examples

The following will describe an example of a ceiling-mounted type lighting device according to this invention with reference to the drawings.

Although a ceiling-mounted type lighting device used in an operating room or the like can freely adjust its lighting direction and height by a surgeon or its assistant, as disclosed in the above documents, examples, which will be described later, relate to cases where they are applied to a ceiling-mounted type lighting device used in a maternity room or the like. Such a lighting device is generally often fixed in a ceiling, so that it is devised to be able to finely adjust a direction of light (light concentration direction) from the lighting device to deliver sufficient light to a treatment site among the treatment table (treatment bed).

FIG. 1 is a perspective view showing an example of a ceiling-mounted type lighting device according to this invention. It will be described with reference to exploded perspective views of FIGS. 2 and 3.

A lighting device 10 mounted in a ceiling, as shown in FIGS. 1 and 2, is mounted typed one which has a housing 20 mounted and fixed with being embedded in the ceiling, and a lighting lamp 60 used for the treatment and a tilt adjustment mechanism 30 for finely adjusting an irradiating direction (beam-emitting direction) from the lighting lamp 60 are provided in the housing 20.

The housing 20 is formed by using a metal plate shaped to a box and has an end edge 22, which is opened toward the interior of a room with an inverted v shape slanting downward, and a bottom plate 26 having a predetermined inner hollow 24 at its middle portion.

The above-mentioned lighting lamp 60 and tilt adjustment mechanism 30 are provided within an interior of the housing 20 partitioned by this bottom plate 26.

The tilt adjustment mechanism 30 is used for adjusting the tilt of the lighting lamp 60 by rotating on respective x-y planes where a transverse direction of a plane of a ceiling (ceiling plane) of the treatment room is an x direction and an across direction thereof is a y-direction, the tilt adjustment mechanism 30 including a first movable body 30A and a second movable body 30B. As any of them, used is the molded one which is made of plastics from a weight reduction point of view.

The first movable body 30A is a component for adjusting the tilt of the lighting lamp 60 on the x-axis and can freely adjust its tilt against the housing 20. This first movable body 30A is a doughnut shaped movable member (rotatable member) as shown in FIG. 2 and a pair of rotation shafts is provided on an outer circumference surface of the first movable body 30A. As shown in FIG. 4, one rotation shaft 36b of the right and left rotation shafts is supported by a shaft-supporting part 36 arranged on the bottom plate 26 and the other rotation shaft 36a is connected to a driving shaft of a driving motor Mx fixed on the bottom plate 26.

The pair of the rotation shafts 36a, 36b is mounted and fixed to reinforcing ribs 34a, 34b provided inside the first movable body 30A to ensure mechanical mounting strength to the first movable body 30A.

As shown in FIGS. 2 and 3, the second movable body 30B is arranged inside the first movable body 30A and is vertically opened conical (funnel-shaped) rotation body. The second movable body 30B is a component for adjusting the tilt on the y-axis against the ceiling pane. Accordingly, similar to the first movable body 30A, a pair of rotation shafts 46a, 46b is provided on an outer circumference surface of the second movable body 30B to cross at right angles of the rotation shaft (x-axis) of the first movable body 30A (see FIGS. 4 and 6). One rotation shaft 46b (right side in FIG. 6) is supported by a shaft-supporting part 31 mounted utilizing a rib 34d of the first movable body 30A and as the other rotation shaft 46a, a driving shaft of a driving motor My mounted and fixed on a rib 34c of the first movable body 30A.

In this way, if constituting the tilt adjustment mechanism 30 by the first and second movable bodies 30A, 30B, the first movable body 30A enables the tilt on the transverse direction (x-axis direction) to the ceiling plane to be freely adjusted and the second movable body 30B enables the tilt of y-axis direction of the second movable body 30B itself to be adjusted independent of the first movable body 30A.

The tilt adjustment mechanism 30 is provided with a light-receiving unit 40 for detecting the tilt and a lighting lamp 60, a tilt of which can be adjusted synchronously with this light-receiving unit 40, which will be described later, and by using the tilt adjustment mechanism 30, a lighting direction (light concentration direction) of the lighting lamp 60 can be adjusted in an appropriate manner. The above-mentioned driving motors Mx, My include any deceleration mechanism, which is devised to adjust the tilts of the directions of the x-axis and y-axis relatively gently.

A light-receiving unit 40 used when adjusting the tilt of the lighting lamp 60 is provided inside the second movable body 30B. The light-receiving unit 40 receives reference light for tilt adjustment (for example, tilt adjustment light by infrared light) emitted from a light emitter 110 configured as a remote-control apparatus (see FIG. 17), which will be described later, an emitted position of the light emitter 110 is specified on the basis of an alteration in an amount of received light, and the pair of the driving motors Mx, My are suitably controlled so that the light-receiving unit 40 always faces the light emitter 110.

Since a position of the light emitter 110 can be considered to be the same as a position of a treatment site, the lighting lamp 60, a tilt of which is controlled with being synchronized with the light-receiving unit 40, is also confronted with a suitable position to the treatment site when the light-receiving unit 40 faces the light emitter 110. Accordingly, it is possible to illuminate a position of the treatment site with a suitable mount of light. A motor controlling example containing the light emitter 110 and the light-receiving unit 40 will be described later.

The light-receiving unit 40 is mounted inside the second movable body 30B on a rotational center axis (z-axis) of the first and second moving bodies 30A, 30B and therefore, a tree-point support as shown in FIGS. 3, 5 and 6 is adopted in this example in which wires 44 extended toward three-directions from an outer circumference of the light-receiving unit 40 are used and they are mounted and fixed on an internal circumference of the second movable body 30B, so that the light-receiving unit 40 can be supported on an interior of the second movable body 30B in a suspending state.

Adopting the tree-point support by the wires 44 is because light from the lighting lamp 60 can reach the treatment table as much as possible it can without being interrupted. In a case of the tree-point support by the wires 44, it may be conceivable that the light-receiving unit 40 vibrates and/or swings when driving the motor so that the wires 44 are supported by using a damper ring 56 on an outer circumference of the light-receiving unit 40, shown in FIG. 3, which gives it any vibration-reducing effect. Notches 54 each for passing through the wire 44 are provided on a part of a slope of the second movable body 30B as shown in FIGS. 3 and 5.

A projector 50 for concentrating light, which constitutes a horn-like emitter mounting the lighting lamp 60, is provided inside the second movable body 30B on an upper surface example of the light-receiving unit 40, as shown in FIG. 3. A top surface side of the projector 50 is opened and a flat-board-like lighting lamp 60 is mounted so as to cover the open portion thereof. By engaging an end edge 58 side of the projector 50 with an interior of an end edge 34 of the second movable body 30B, the projector 50 is integrated with the second movable body 30B. The end edge 58 of the projector 50 and the end edge 34 of the second movable body 30B are configured to have the same diameter, which enables them to be integrated with each other.

With this, when rotating (tilting) the second movable body 30B on the y-axis direction, the lighting lamp 60 also rotates together with this. The projector 50 is used for limiting a lighting area from the lighting lamp 60 and concentrating the light on the treatment table.

The lighting lamp 60 is a sheet-shaped lighting lamp which is constituted by a predetermined number of LEDs arranged on a flat surface, in this example, and a heat sink 62 is attached to a top surface side thereof. A number of the used LEDs is selected according to brightness (illumination) to be required on the treatment table.

Here, as described above, the light emitter 110 acting as a remote controller is prepared in a treatment room (see FIG. 15) to perform the tilt adjustment against the lighting lamp 60 while as shown in FIGS. 3 and 5 and the like, the above-mentioned light-receiving unit 40 is provided on a side of the lighting device 10. It is possible to recognize a tilt of the light-receiving unit 40 to the light emitter 110 by judging sizes in an amount of light received by each of the optical sensors constituting the light-receiving unit 40, in this example, four optical sensors A through D (see FIG. 9 and the like). Since the tilt of the light-receiving unit 40 corresponds with the tilt of the lighting lamp 60, it is possible to adjust the tilt of the lighting lamp 60 by adjusting the tilt of the light-receiving unit 40.

FIG. 7 is a perspective view showing an example of the light-receiving unit 40 which is arranged on the central part of the tilt adjustment mechanism 30. FIG. 8 is a cross section thereof. The light-receiving unit 40 has a sensor unit 45 containing four optical sensors almost arranged crosswise and this sensor unit 45 is mounted on a circuit board 43 and is mounted and fixed on a case 42 via the circuit board 43.

As each of the optical sensor in this example, an infrared sensor is used and a light-shielding body 55 for applying light onto only a desired area is provided on a front side (a light-receiving surface) of the sensor unit 45. The desired area relates to areas that are near the four corners of the optical sensor A through D, as shown in FIG. 9, in this example and the light-shielding body 55 is arranged near the sensor unit 45 so as to concentrate beams around these four corners simultaneously.

The light-shielding body 55 is provided with four through-holes 47. The four through-holes 47 confront the optical sensors and thickness of the light-shielding body 55 and a size of a diameter are selected so as to concentrate light so that light spots become sizes shown in FIG. 9 at positions shown by broken lines in FIG. 9. For example, when the dimension of the sensor unit 45 is a regular square shape of 2 by 2 cm, a diameter of the spot is selected so as to be about 2.5 mm by an experiment.

Thus, daringly concentrating the light on the four corners with the light spots being shifted from the center is because a difference in the amounts of the received light can be detected on the basis of an output of each sensor even if the optical sensors are arranged in proximity to each other; and because any influence by variety in sensitive between the individual optical sensors is as little suppressed as possible. By a pair of the arms 55a, 55b provided on the light-shielding body 55, it is fastened and fixed on bosses 42b provided inside the case 42.

The sensor unit 45 and the light-shielding body 55 are clogged by a cover 48. They are fixed from outside of the case 42 using legs 49 provided on the cover 48.

A slit 48a having predetermined width and length is formed in a central portion of the cover 48 and this slit 48a is devised to block any unnecessary light from outside. Tilt adjustment light for adjusting the tilt of the light-receiving unit 40 reaches the sensor unit 45 through this slit 48a.

The following will describe the light emitter 110 which acts as the remote controller for adjusting the tilt (on the x-axis and y-axis directions) of the tilt adjustment mechanism 30.

FIG. 10 is a plan view of the light emitter 110 and FIG. 11 is a cross section thereof. The light emitter 110 has a plurality of light-emitting diodes 120 mounted on a circuit board 112. In this example, as the light-emitting diodes 120, three infrared light-emitting diodes (IR LED) are used and they are arranged on the same circumference at intervals of about 120 degrees as shown in FIG. 10. A visible light-emitting diode can be used in place of the infrared light-emitting diode.

A protection cover 116 is arranged on an upper surface of each of the light-emitting diodes 120 via a convex lens 114 and it is so revised that light (beam) from each of the light-emitting diodes 120 can reach a side of the light-receiving unit 40 in a mixed state by an action of this convex lens 114. Since there is a distance of 2-3 m to the light-receiving unit 40, an intension of each of the light-emitting diodes can be so adjusted to obtain a light-emitting intension corresponding thereto.

As tilt adjustment light (optical signal) from each of the light-emitting diodes, pulse-modulated one is used. This is because of preventing the influence of light from outside and because the intense of the lighting lamp 60 itself can be controlled by changing pulse width. The same effect can be obtained by changing frequency in place of the pulse-width modulation.

In FIG. 10, "118" depicts a switch for controlling on/off of the optical signal and "119" depicts a light control switch which changes an amount of light from "strong" to "weak" via "medium" every time pressing the switch.

The following will describe an adjusted example of the tilt of the lighting lamp 60 with reference to FIG. 12 and later. As is the case of FIG. 12, if the light-receiving unit 40 is constituted of four optical sensors A, B, C and D arranged crosswise (two-by-two-matrix shaped) and its center "p" (a center of cross) is a rotational center, the tilt adjustment mechanism 30 of the above-mentioned light-receiving unit 40 is arranged so that a (x-y) plane formed by two axes (x and y axes), which are respectively orthogonal to a vertical axis "z" passing through the center "p", is the same plane as a ceiling plane as described above.

Since the light-receiving unit 40 is integrated with the tilt adjustment mechanism 30, a position of the light emitted from the lighting lamp 60 to be concentrated to the treatment table alters when the tilt of the light-receiving unit 40 alters. Positions of the through-holes 47 of the light-shielding body 55 to the sensor unit 45 and sizes thereof are selected so that light spots Sa-Sd from the light emitter 110 are not concentrated on an entire surface of a light-receiving surface of each of the optical sensors A through D but are concentrated only on the four corners of each of the optical sensors A through D, as shown in FIG. 9, as described above.

The tilt of the light-receiving unit 40 will be adjusted as follows.

First, FIGS. 13 and 15 show an example when the (x-y) plane of the light-receiving unit 40 is parallel with the ceiling plane and the light-emitting center "q" of the light emitter 110 faces the light-receiving center "p". FIG. 13 shows a relationship between a pair of the optical sensors A and B arranged on the x-axis and FIG. 15 shows a relationship between a pair of the optical sensors A and C arranged on the y-axis.

As the tilt adjustment modes, there are an x-axis adjustment mode in which the light-receiving unit 40 rotates (tilts) around the x-axis by driving the x-axis and a y-axis adjustment mode in which the light-receiving unit 40 rotates (tilts) around the y-axis.

(1) First, when amounts of received light of the respective optical sensors A through D are La through Ld, the x-axis is controlled as to rotate, in the x-axis adjustment mode, until La+Lb=Lc+Ld . . . (1), namely, so that a sum of the amounts of the received light of the light side equals to a sum of the amounts of the received light of the right side (see FIG. 12). Form this, the tilt on the x-axis is adjusted.

Similarly, in the y-axis adjustment mode, the y-axis is controlled as to rotate like an arrow shown in FIG. 12 until La+Lc=Lb+Ld . . . (2), so that the tilt on the y-axis is adjusted.

As is the case of FIG. 13, if distances from the optical sensors A and B to the light-emitting center "q" are "a" and "b", a=b when the light-emitting center "q" faces the light-receiving center "p", so that the amounts of received light La, Lb of the respective optical sensors A and B are La=Lb and the amounts of received light Lc, Ld of the respective optical sensors C and D are Lc=Ld. Since a=b, the sums of received light of the optical sensors A, B and C, D which adjoin along the x-axis direction equal the equation (1), La+Lb=Lc+Ld . . . (3).

Similarly, the sums of received light of the optical sensors A, C and B, D which adjoin along the y-axis direction equal the equation (2), La+Lc=Lb+Ld . . . (4) so that a state of equilibrium in amounts of both of the received light are kept. Therefore, both of the driving motors Mx, My are not driven and controlled. In other words, the tilt adjustment on both the x-axis and y-axis are not executed.

(2) As is the case of FIG. 13, if the light-emitting center "q" of the light emitter 110 alters to only $-\Delta x$ along the x-axis, namely, is shifted from the light-receiving center "p" by only $\Delta x$, a'<b'. Since the amount of received light is inversely proportional to the square of the distance, La'>Lb' in this case and similarly, Lc'>Ld', not shown by the drawing, so that a state of equilibrium in amounts of both of the received light is lost. However, since La'=Lc' and Lb'=Ld', a relationship between the sum of the amounts of received light of the optical sensors A, B and the sum of the amounts of received light of the optical sensors C, D is represented as La'+Lb'=Lc++Ld' ... (5), so that a relationship of equilibrium is kept. Therefore, the motor Mx for the x-axis is not driven.

On the other hand, a relationship between the sum of the amounts of received light of the optical sensors A, C and the sum of the amounts of received light of the optical sensors B, D is represented as La'+Lc'>Lb'+Ld' ... (6), so that a relationship of equilibrium is lost and the motor My for the y-axis is driven until the equation (6) is in equilibrium (see FIG. 14).

As the result thereof, only the y-axis is driven as shown by an arrow in FIG. 12 and the tilt of the light-receiving unit 40 is controlled so that the light-emitting center "q" faces the light-receiving center "p" and a"=b" as shown in FIG. 14.

(3) On the contrary of the above description, as in the case of FIG. 15, if the light-emitting center "q" is shifted therefrom by only $-\Delta y$ along the y-axis, c'<a'. Therefore, the amounts of received light La and Lc become Lc'>La' and similarly, Ld'>Lb' and a relationship of equilibrium is lost but Lc'=Ld', La'=Lb' ... (7) because the optical sensors A, B and C, D are parallel with each other in connection with the x-axis. Form this relative equation, a relationship between the sum of the optical sensors A, C and the sum of the optical sensors B, D is derived as La'+Lc'=Lb'+Ld' ... (8), so that a relationship of equilibrium is kept.

However, a relationship between the sum of the optical sensors C, D and the sum of the optical sensors A, B is derived as Lc'+Ld'=La'+Lb' ... (9), so that the motor Mx for the x-axis is driven until both sides of the equation (9) correspond to each other.

As a result thereof, the y-axis is driven as shown by an arrow in FIG. 12 and the tilt of the light-receiving unit 40 is controlled so that the light-emitting center "q" faces the light-receiving center "p" on the x-axis side and a"=b" as shown in FIG. 16.

(4) When the light-emitting center "q" stays in the (x-y) plane out of the x-axis and y-axis, $\Delta x$ and $\Delta y$ are finite values, and in this case, by executing the control of both of the above items (2) and (3), the tilt of the light-receiving unit 40 is controlled following the light-emitting center "q", so that an automatic control such that the light-receiving center "p" always faces the light-emitting center "q" is executed. Specifically, rotations on the x-axis and the y-axis are controlled by driving the motors Mx and My as shown in FIG. 12 and the light-receiving center "p" can face the light-emitting center "q". Thereby, it is possible for the lighting device 10 to always concentrate light around a desired position of the treatment table. This automatic tracking is executed only while the light emitter 110 turns on.

FIG. 17 illustrates an example of a tilt control system 100 provided in the tilt adjustment mechanism 30. The light-receiving unit 40 is provided with the above-mentioned sensor unit 45 and a calculation circuit 140 for calculating four output signals from the sensor unit 45 in which the four calculated outputs are supplied to a microcomputer control circuit 142 mounted on an upper portion of the housing 20.

The calculation circuit 140 alternately executes an x-axis calculation (CX), La+Lb=CX1 and Lc+Ld=CX2, and a y-axis calculation (CY), La+Lc=CY1 and Lb+Ld=CY2, among the signals shown in the equations (1) and (2). These calculated outputs are determined in size by the microcomputer control circuit 142, so that rotation amounts and rotation directions of the motors Mx, My are controlled by the output of the microcomputer control circuit 142. When the determination result indicates the same result as that of each of the equations (3) and (4), no tilt adjustment of the sensor unit 45 is executed. When the calculation result of CX1 indicates the equation (6), only the motor My is driven and the tilt adjustment on the y-axis is executed. Similarly, when the calculation result indicates the equation (9), the motor Mx is now driven and the motor Mx is controlled until both sides of the equation (9) correspond to each other.

Since the motors Mx and My are alternately driven so that both sides of each of the equations (6) and (9) correspond to each other when the calculation result indicates each of the equations (6) and (9), the light-receiving unit 40 is controlled so that it finally faces the light emitter 110 as the result even if the light-receiving unit tilts to any of the x-axis direction and y-axis direction.

Even apart from this, the microcomputer control circuit 142 products an output signal for adjusting brightness of the lighting lamp 60. The microcomputer control circuit 142 reads a signal from the switch 119 of the light emitter 110 and supplies a signal of "strong", "medium" or "weak" to a lighting control circuit 146 for the lighting lamp 60 every time pressing the switch to control the light. The brightness can be satisfied by carrying out PWM control of voltage or the like to be applied to the lighting lamp 60.

In addition, in FIG. 17, a circuit 102 illustrates a main power source circuit and a circuit 144 illustrates a power source circuit for the control circuit 130 and the like.

Although the above executed examples have applied this invention to medical lighting devices, this invention may be also applied to any ceiling type lighting devices which is required to adjust the light concentration position of the lighting lamp.

INDUSTRIAL APPLICABILITY

This invention is preferably applied to any lighting device, which is used for medical purpose, embedded into a ceiling.

DESCRIPTION OF CODES

10 . . . Medical Lighting Device;
30 . . . Tilt Adjustment Mechanism;
30A, 30B . . . First and Second Movable Bodies;
40 . . . Light-Receiving Unit;
45 . . . Sensor Unit;
47 . . . Through holes;
48 . . . Cover;
55 . . . Light-Shielding Body;
60 . . . Lighting Lamp;
110 . . . Light Emitter;
120 . . . Infrared Light-Emitting Diode;
114 . . . Convex Lens;
A-D; Optical Sensors;
p . . . Light-Receiving Center;
q . . . Light-Emitting Center; and
Mx, My . . . Tilt Control Motors.

The invention claimed is:

1. A ceiling-mounted type lighting device, comprising:
a light-receiving unit containing four optical sensors arranged crosswise and a light-shielding body through which four through-holes are cut as positions that are respectively opposite to light-receiving surfaces of the optical sensors; and
a tilt adjustment mechanism containing a first movable body and a second movable body which are mounted on first and second rotation shafts arranged on a same plane to cross at right angles,
wherein the light-shielding body is arranged so as to be opposite to the optical sensors with a clearance between the light-shielding body and the optical sensors,
wherein a single tilt adjustment light emitted from a light emitter passes through the through-holes to form four spotted tilt adjustment lights which are respectively concentrated on the sensors,
wherein the tilt adjustment mechanism is mounted in a housing constituting the ceiling-mounted type lighting device, and
wherein the light-receiving unit and a lighting lamp illuminating a side of the light emitter are mounted on a rotational center axis of the second movable body, and a tilt of the light-receiving unit is adjusted according to amounts of the four spotted tilt adjustment lights formed on the optical sensors.

2. The ceiling-mounted type lighting device according to claim 1, wherein the light-receiving unit comprises a control circuit for calculating tilt control outputs from outputs from the four optical sensors obtained at a same time as receiving the single tilt adjustment light from the light emitter, and controlling rotations of the first and second rotation shafts by the tilt control outputs to the light-receiving unit.

3. The ceiling-mounted type lighting device according to claim 1, wherein the second movable body is rotatably mounted inside the first movable body and in a rotational plane which crosses at right angles of the rotation shaft of the first movable body.

4. The ceiling-mounted type lighting device according to claim 1, wherein the first movable body has a truncated cone form, a lighting lamp for irradiating a site of the light emitter is mounted on a top of the truncated cone, and a bottom thereof is fixed on the first movable body.

5. The ceiling-mounted type lighting device according to claim 1, wherein the light-receiving unit and the lighting lamp are arranged in a plane passing through central axes of the first movable body and the second movable body.

6. The ceiling-mounted type lighting device according to claim 1, wherein the tilt of the light-receiving unit is adjusted according to a difference between the amounts of the four tilt adjustment lights received by the optical sensors.

7. The ceiling-mounted type lighting device according to claim 1, wherein the tilt of the light-receiving unit is adjusted such that the amounts of the four tilt adjustment lights received by the optical sensors become equal to one another.

8. The ceiling-mounted type lighting device according to claim 1, wherein the tilt of the light-receiving unit is adjusted such that the light-receiving unit faces the light emitter.

* * * * *